United States Patent [19]

Amano et al.

[11] 4,114,587
[45] Sep. 19, 1978

[54] FAIL-SAFE OIL FEED CONTROL LINKAGE FOR TWO CYCLE INTERNAL COMBUSTION ENGINE

[75] Inventors: Toshio Amano; Hidetoshi Kaku, both of Akashi, Japan

[73] Assignee: Kawasaki Jukogyo Kabushiki Kaisha, Kobe, Japan

[21] Appl. No.: 750,316

[22] Filed: Dec. 14, 1976

[30] Foreign Application Priority Data

Dec. 16, 1975 [JP] Japan .................... 50-170290[U]

[51] Int. Cl.² .................................................. F01M 1/00
[52] U.S. Cl. ............................ 123/196 S; 123/73 AD
[58] Field of Search ............. 123/73 AD, 98, 196 R, 123/196 S; 74/50 R; 180/5 A, 33 R, 77

[56] References Cited

U.S. PATENT DOCUMENTS

| | | | |
|---|---|---|---|
| 2,130,578 | 9/1938 | Baker | 74/501 R |
| 2,480,083 | 8/1949 | McMillan | 74/501 R |
| 3,183,736 | 5/1965 | Jacobson | 74/501 R |
| 4,019,402 | 4/1977 | Leonheart | 74/501 R |

FOREIGN PATENT DOCUMENTS 1,157,036 11/1963 Fed. Rep. of Germany ..... 123/73 AD
1,189,315 3/1965 Fed. Rep. of Germany ..... 123/73 AD

*Primary Examiner*—Charles J. Myhre
*Assistant Examiner*—David D. Reynolds
*Attorney, Agent, or Firm*—Sughrue, Rothwell, Mion, Zinn and Macpeak

[57] ABSTRACT

An oil pump control lever 3 is spring biased toward the fully open or maximum supply position 3b to implement fail-safe engine operation if the control wire 4 for the lever is cut or loosened. The far end of the wire 4 is connected to a handlebar throttle control lever 8 on the opposite side of its pivot point 10 from the connection of a throttle control wire 7, and the torque applied to the throttle control lever by the throttle control wire exceeds that applied by the oil supply control wire.

3 Claims, 2 Drawing Figures

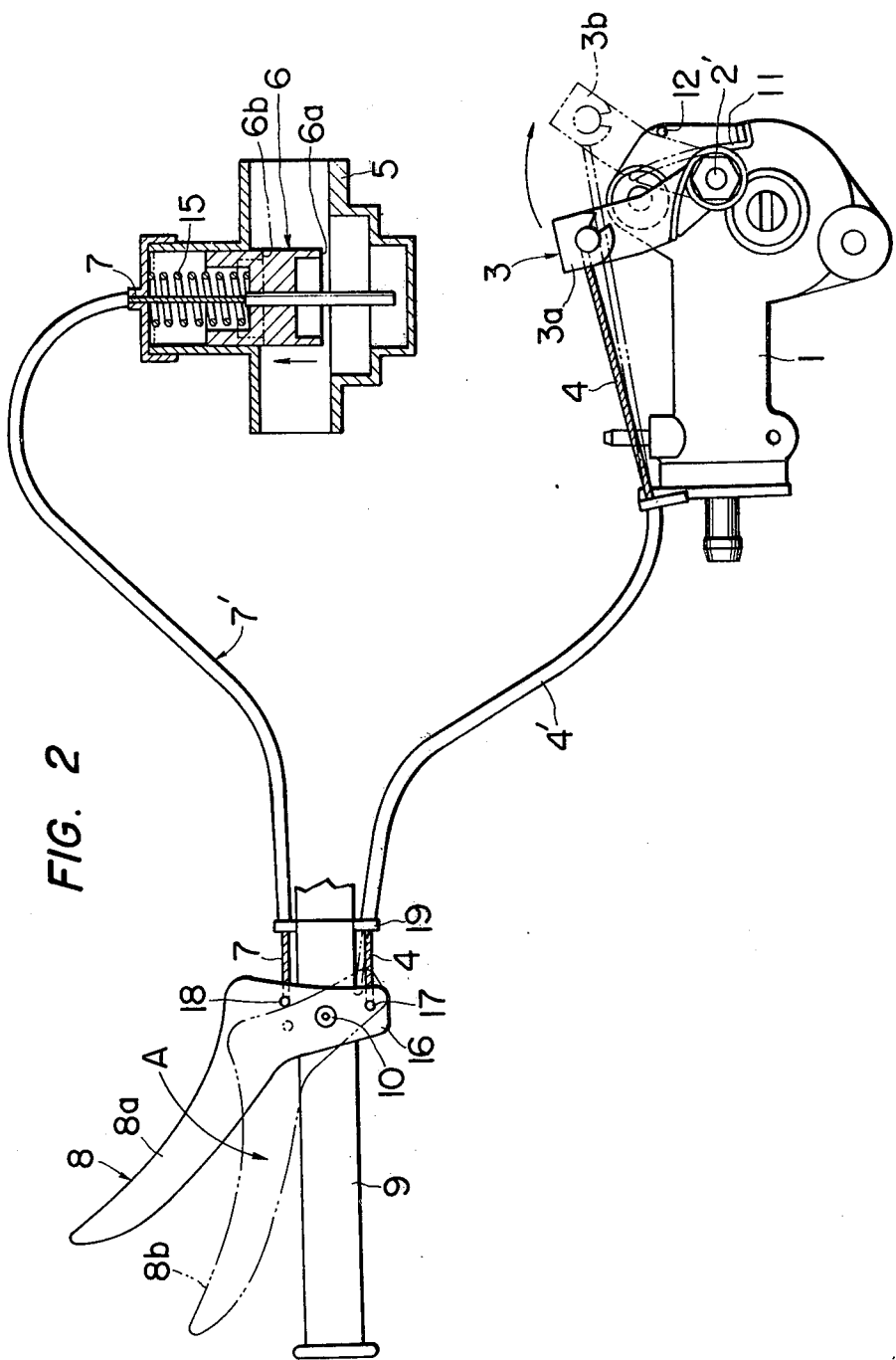

under the invention.
FAIL-SAFE OIL FEED CONTROL LINKAGE FOR TWO CYCLE INTERNAL COMBUSTION ENGINE

BACKGROUND OF THE INVENTION

1. Field of the Invention

This invention relates to a separate, fail-safe, lubrication oil feed control linkage for a two cycle internal combustion engine.

2. Description of the Prior Art

Recently, two-stroke or two cycle internal combustion engines has been widely adapted to motorcycles and snowmobiles. Such engines commonly have a single control lever for adjusting the carburetor throttle and the lubrication oil feed, and the control wires are typically coupled together for joint movement so that the fuel and lubrication oil supplies increase in unison as the control lever is squeezed.

The oil pump is usually provided with a return mechanism biased toward the oil cut-off direction, however, and therefore if the oil pump control wire is cut or loosened in any way, the oil supply is stopped whereby the engine is liable to be damaged or burned out without notice.

SUMMARY OF THE INVENTION

The main object of this invention is to provide a fail-safe oil feed control linkage for preventing an engine from being damaged by lack of lubrication oil in the event of linkage loosening or breakage.

Briefly, and in accordance with the present invention, an oil pump control lever is spring biased toward the fully open or maximum supply position to implement fail-safe engine operation if the control wire for the lever is cut or loosened. The far end of the wire is connected to a handlebar throttle control lever on the opposite side of its pivot point from the connection of a throttle control wire, and the torque applied to the throttle control lever by the throttle control wire exceeds that applied by the oil supply control wire.

BRIEF DESCRIPTION OF THE DRAWINGS

In the drawings:

FIG. 2 shows a schematic illustration of a linkage arrangement according to this invention.

DETAILED DESCRIPTION OF THE PREFERRED EMBODIMENT

Figure 1:
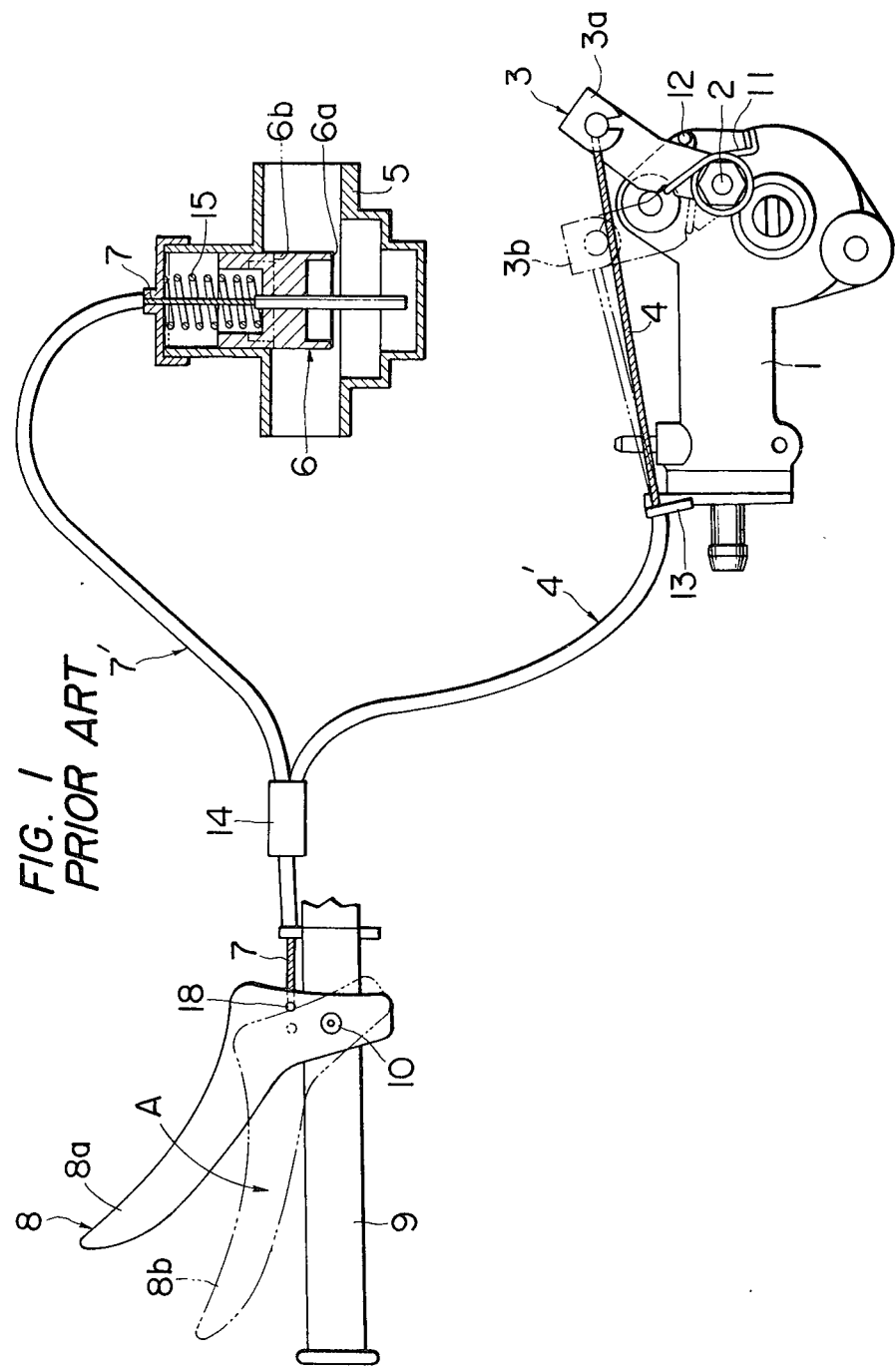
FIG. 1 shows a schematic illustration of a prior art throttle and oil feed control linkage.

FIG. 1 shows a conventional throttle and oil feed linkage arrangement, wherein reference numeral 1 designates an oil pump driven by an engine (not shown). The oil pump has an internal reciprocating plunger (not shown), whose stroke is regulated by a cam mounted on a control shaft 2. An oil supply control lever 3 is coupled to the shaft 2 by a nut and extends outwardly from the pump.

Reference numerals 3a and 3b show the control lever positions for a cut-off oil supply and a maximum oil supply, respectively. A return spring 11 engages the pump body 1 at one end and the control lever 3 at the other end. Thus, the control lever 3 is biased in a clockwise direction about the shaft 2 by the elastic force of the spring, whereby the lever is normally returned to the closed position 3a abutting a stop post 12. Reference numeral 4 designates an oil feed control wire slidably disposed within an outer sheath 4'. The sheath is connected to a bracket 13 at one end and to a connector coupling 14 at the other end. A throttle control wire 7 is connected to a post 18 on a pivotable throttle lever 8 at one end and to a throttle 6 at the other end, and is also connected to the wire 4 by the connector coupling 14. Reference numerals 5, 9 and 10 designate a carburetor, a handlebar grip, and a pivot post, respectively. The control wire 7 is slidably disposed in an outer sheath 7'. A carburetor spring 15 biases the throttle 6 towards a closed position.

If the throttle lever 8 is gripped and rotated in the direction of arrow A, that is, moved from a first position 8a to a second position 8b, the throttle 6 is moved from a closed position 6a to an open position 6b by the control wire 7. Simultaneously, the oil supply control lever 3 is moved from its closed or cut-off position 3a to its open position 3b against the force of the return spring 11. If the control wire 4 is cut or loosened in any way during the operation of the engine, however, the control lever 3 is returned to its closed position 3a by the force of the spring 11, whereby the engine is liable to be damaged or burned out owing to the lack of lubricating oil.

FIG. 2 shows an embodiment of a fail-safe oil feed control device according to this invention. In this embodiment, the control lever 3 (and the stroke regulating cam coupled thereto) is so designed that the oil supply is decreased when the lever is rotated in a counterclockwise direction toward position 3a, and is increased when it is rotated in a clockwise direction toward position 3b, and the control lever 3 is normally biased toward the fully open position 3b by the return spring 11. That is, the engine lubricating oil supplied by the pump 1 is minimum or zero at position 3a and maximum at position 3b. In addition, the sheath 4' is connected to a handlebar bracket 19, and the wire 4 is connected to a post 17 on an extension arm 16 of the throttle lever.

In FIG. 2, when the throttle lever 8 is moved in the direction of arrow A, the throttle 6 opens. At the same time, the control lever 3 is moved toward its open position 3b since the control wires 4 and 7 are disposed on opposite sides of the pivot post 10. That is, when the throttle lever 8 is rotated counterclockwise the wire 7 is pulled to thereby open the throttle 6 against the force of spring 15. The wire 4, however, is now mounted on the opposite side of the pivot post from the wire 7, and therefore the connection post 17 moves in a counterclockwise direction. This allows the return spring 11 to pull the wire 4 and rotate the control lever 3 from position 3a to position 3b. Accordingly, the lubricating oil supply increases. When the throttle lever 8 is released it is returned to position 8a by rotating in a clockwise direction under the force of the carburetor spring 15. The spring 15 is preset to have a greater moment on lever 8 than that provided by the spring 11. Accordingly, when the throttle lever is returned to position 8a against the force of the return spring 11, the latter simultaneously accumulates energy to open the oil supply control lever 3 in the event of a linkage failure.

In such a situation, if the control wire 4 is cut or loosened during the operation of the engine, the control lever 3 moves to the fully open position 3b owing to the force stored in the return spring 11, to thereby increase the oil supply and prevent any damage to the engine.

Further, such excess oil supply produces large amounts of high density white smoke in the engine exhaust, which alerts the operator to the linkage failure.

By suitably selecting the force or strength of the return springs 11 and 15, a very soft and smooth throttle lever action can be achieved since the springs act against each other and thus tend to cancel the major frictional forces involved in the linkage system.

What is claimed is:

1. A fail-safe lubricating oil supply control linkage for a two cycle internal combustion engine, comprising:
   (a) an oil pump housing,
   (b) an oil supply control lever pivotally mounted on the housing for rotation about a control axis between a closed, minimum oil supply position and a fully open, maximum oil supply position,
   (c) a throttle lever rotatable about a pivot axis,
   (d) a throttle control wire connected to the throttle lever on one side of the pivot axis,
   (e) an oil supply control wire having one end connected to the oil supply control lever and the other end connected to the throttle lever on the other, opposite side of the pivot axis, and
   (f) first spring means biasing the oil supply control lever toward the fully open, maximum supply position.

2. An oil supply control linkage as defined in claim 1, further comprising second spring means acting on the throttle lever, via the throttle control wire, in a first rotational direction, wherein the first spring means acts on the throttle lever, via the oil supply control wire, in a second, opposite rotational direction, and wherein the rotational force exerted by the second spring means is greater than that exerted by the first spring means.

3. An oil supply control linkage as defined in claim 2, wherein the throttle lever is rotatably mounted to a handlebar grip.

* * * * *